(12) United States Patent
Kita et al.

(10) Patent No.: US 8,142,166 B2
(45) Date of Patent: Mar. 27, 2012

(54) HUB FOR A HORIZONTAL AXIS WIND TURBINE

(75) Inventors: Masakazu Kita, Tokyo (JP); Ikuo Tobinaga, Tokyo (JP); Atsuki Tomizawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1162 days.

(21) Appl. No.: 11/943,343

(22) Filed: Nov. 20, 2007

(65) Prior Publication Data

US 2008/0118356 A1 May 22, 2008

(30) Foreign Application Priority Data

Nov. 22, 2006 (JP) .................................. 2006-315629

(51) Int. Cl.
*F03D 1/06* (2006.01)
(52) U.S. Cl. .................................................. 416/244 R
(58) Field of Classification Search ..................... 415/4.3, 415/4.5, 908; 416/244 R, 245 R
See application file for complete search history.

(56) References Cited

U.S. PATENT DOCUMENTS

| 7,614,850 B2 * | 11/2009 | Rogall ....................... 416/244 R |
| RE41,326 E * | 5/2010 | Delucis et al. ............ 416/245 R |
| 2005/0254949 A1 * | 11/2005 | Schubert ................... 416/170 R |

FOREIGN PATENT DOCUMENTS

| NL | 1021673 C6 * | 4/2004 |
| WO | 03/064854 A1 | 8/2003 |
| WO | 2004/090326 A1 | 10/2004 |

* cited by examiner

*Primary Examiner* — Richard Edgar
(74) *Attorney, Agent, or Firm* — Haynes and Boone, LLP

(57) ABSTRACT

To provide a lightweight hub of a horizontal axis wind turbine with a balanced strength, the hub 1 related to the present invention comprises a reinforcement plate 4 coupled to the spherical shell 2 on the peripheral edge in the round region G inside the circular flange 3 used to secure a blade. In addition to being off-center at the point C side, an off-center opening 5, that contains the center B of the region G, is formed in the region G. The reinforcement plate 4 is formed at the remainder portion of the region G after removing the off-center opening 5. By means of an unequal arrangement of the reinforcement plate 4 and the opening 5 on the inside of the circular flange 3, severe imbalances due to the casting of the hub 1 are cancelled and a balanced strength is obtained, making it also easier to reduce the weight.

18 Claims, 9 Drawing Sheets

HUB FOR A HORIZONTAL AXIS WIND TURBINE

CROSS REFERENCE TO RELATED APPLICATIONS

This application claims priority under 35 U.S.C. 119 based upon Japanese Patent Application Serial No. 2006-315629, filed on Nov. 22, 2006. The entire disclosure of the foresaid application is incorporated herein by reference.

FIELD OF THE INVENTION

The present invention relates to a hub of a horizontal axis wind turbine.

BACKGROUND OF THE INVENTION

At present, wind energy power conversion systems which utilize horizontal axis wind turbines with an objective of obtaining stable electrical power from natural wind have been proposed and put into practical use. As shown in FIG. 7 and FIG. 8, these horizontal axis wind turbines are comprised of a rotor that has a hub 21 and a blade 22, a nacelle 24 that axially supports the rotor through a main shaft 23 that extends in the approximate horizontal direction connected to the hub 21, and a tower installed in an approximate vertical direction along with supporting the nacelle 24. In addition, a spinner 31, that covers the hub 21, is also attached. As shown in FIG. 8, a wind energy power conversion system that utilizes a horizontal axis wind turbine is equipped with a generator 27 connected to the main shaft 23 inside the nacelle 24 through a step-up gear 26 to form the arrangement of a wind energy power conversion system and generates electrical power by receiving wind and converting the rotational energy of the rotating rotor to an electrical energy. Conventionally, as shown in FIG. 9, a main shaft connecting part 29 on a spherical shell 28 and a circular flange 30 used to secure a blade are used as the hub 21 of a horizontal axis wind turbine. The inside of the circular flange 30 is open. A base assembly of a blade is secured to this circular flange 30. Casting is applied as the method to manufacture the hub.

PCT Publication No. WO2004/090326 A1 (hereinafter referred to as "Patent Reference 1") and PCT Publication No. WO2003/064854 A1 (hereinafter referred to as "Patent Reference 2") both describe a composition formed with a reinforcement plate that covers one part of the inside of a circular flange without opening the entire inside of a circular flange used to secure a blade.

The reinforcement plate described in Patent Reference 1 is formed in a bridge shape extending radially in two to four directions from the center of a circular flange used to secure a blade and is coupled to a spherical shell at a position inside a circular flange. The reinforcement plate described in Patent Reference 2 is formed in a shape that covers the peripheral edge of a circular region inside a circular flange and the center area is opened.

This type of hub that has a reinforcement plate inside a circular flange used to secure a blade can ensure sufficient strength even if the casing thickness of the spherical shell is thin. This makes it possible to reduce the weight of the hub.

In addition, by means of making the casing thickness of the hub thinner, the inherent segregation of the casting (which occurs more easily when the casing thickness is thicker) can be reduced making it possible to improve the quality.

The following problems exist for the conventional technology described above. Casting methods are adopted in which molten metal enters from the lower area of a casting mold, rises inside the hub molding space, and reaches the exhaust area at the upper portion, while casting a hub.

This type of casting method has the following different properties at the lower area on the inlet side and the upper area on the exhaust side.

At first, the lower area on the inlet side solidifies and then the upper area on the exhaust side solidifies. Compared to the lower area on the inlet side, segregation or microscopic shrinkage (micro-porosity) easily occurs on the upper area on the exhaust side. Because a thinner casing of the casting makes it more difficult for defects to occur while casting such as segregation or microscopic shrinkage, the casing thickness is designed to be thinner higher up in the upper area on the exhaust side. Nevertheless, compared to the lower area on the inlet side, the upper area of the exhaust side has a disadvantage in terms of strength.

Because a high strength is required on the main shaft connection side for the hub, the main shaft connection side of the hub must be established on the lower area of the casting mold.

If however, the main shaft connection side of the hub is established on the lower area of the casting mold, the main shaft connection side of the hub will have a relatively high strength and the tip of the hub will have a low strength resulting in an imbalance.

In the hub in Patent Reference 1, the reinforcement plate extends from the center of the circular flange used to secure a blade to the main shaft connection side and is coupled to the spherical shell at a position inside the circular flange. In other words, considering the reinforcement of the main shaft connection side, relatively speaking, it is not obvious to reinforce the tip of the hub.

Because of this, there is a chance that the imbalance in strength in the reinforcement plate in Patent Reference 1 may not be sufficiently cancelled.

In addition, since the main shaft connection side of the hub is formed with a casing thickness of greater thickness, the coupling of the reinforcement plate to the main shaft connection side of the hub is a drawback from the viewpoint of lighter weight.

In the hub in Patent Reference 2, the reinforcement plate is comprised in a shape that covers the peripheral edge of the inside circular region of the circular flange and the reinforcement strength at the main shaft connection side of the hub and the tip are at the same level. The reinforcement plate is also coupled to the spherical shell at a position inside the circular flange at the main shaft connection side.

Therefore, the reinforcement plate in Patent Reference 2 cannot sufficiently cancel the imbalance in strength mentioned above.

Even further, since the casing thickness of the main shaft connection side of the hub is formed with a heavy thickness, the coupling of the reinforcement plate to the main shaft connection side of the hub is a drawback from the viewpoint of lighter weight.

The present invention takes the problems in the conventional technology mentioned above and provides a lightweight hub of a horizontal axis wind turbine with a balanced strength.

SUMMARY OF THE INVENTION

A mode of the invention that solves the problems mentioned above is a hub of a horizontal axis wind turbine having a shell having formed thereon a main shaft connecting part, a flange used for securing a blade and a reinforcement coupled to the shell at a peripheral edge of an inner region inside the flange, wherein a reference plane is defined by a center of the inner region and a central axis of a main shaft connected by the main shaft connecting part, and an opening is formed at the inner region that is off-centered toward a side of a first of two points at the intersection of the reference plane and the peripheral edge of the inner region, the first point being at the main shaft connecting part side.

In an aspect of the invention in the hub of a horizontal axis wind turbine, the opening contacts the first point.

In another aspect of the invention, in the hub of a horizontal axis wind turbine, the opening contacts the peripheral edge of the inner region at a predetermined width that includes the first point.

In still another aspect of the invention, in the hub of a horizontal axis wind turbine, a casing thickness of the reinforcement is gradually reduced from the main shaft connecting part side to an opposite side.

In a further aspect of the invention, the hub of a horizontal axis wind turbine further has a small hole formed at an opposite position of the opening at the inner region.

In yet another aspect of the invention, in the hub of the horizontal axis wind turbine, the opening at the inner region is a recess formed on the reinforcement.

In another aspect of the invention, in the hub of the horizontal axis wind turbine, the opening at the inner region is a hole formed on the reinforcement.

In another aspect of the invention, in the hub of the horizontal axis wind turbine, the shell is a spherical shell.

In another aspect of the invention, in the hub of the horizontal axis wind turbine, the inner region is round shaped.

In another aspect of the invention, in the hub of the horizontal axis wind turbine, the opening includes the center of the inner region.

According to the present invention, because of the off-center reinforcement and opening on the inside of the flange, relatively speaking, reinforcement of the tip of the hub becomes obvious with respect to the main shaft connecting side of the hub. Therefore, severe imbalances between the main shaft connecting side of the hub and the tip due to the casting mold of the hub are cancelled thereby making it possible to obtain a hub of a horizontal axis wind turbine with a well-balanced strength.

Because a balanced strength is obtained, there is no need to thicken the casing to strongly match the weak areas making it possible to pursue even thinner casing overall which in turn makes it easier to reduce the weight due to thinner casing.

Even further, by means of providing an opening at the area formed where the casing of the main shaft connection side of the hub is thick, that material will be omitted and thus, the weight can also be effectively reduced.

BRIEF DESCRIPTION OF THE DRAWINGS

FIG. 7 is a perspective view showing an example of a horizontal axis wind turbine that the hub related to the present invention can be applied to;

DETAILED DESCRIPTION OF THE PREFERRED EMBODIMENTS

In the following, embodiments of the present invention will be described referring to the attached drawings. However, the present invention is not limited to the embodiments of the present invention described below.

First Embodiment

At first, a first embodiment of the present invention will be described referring to FIG. 1 to FIG. 4.

Figure 1:
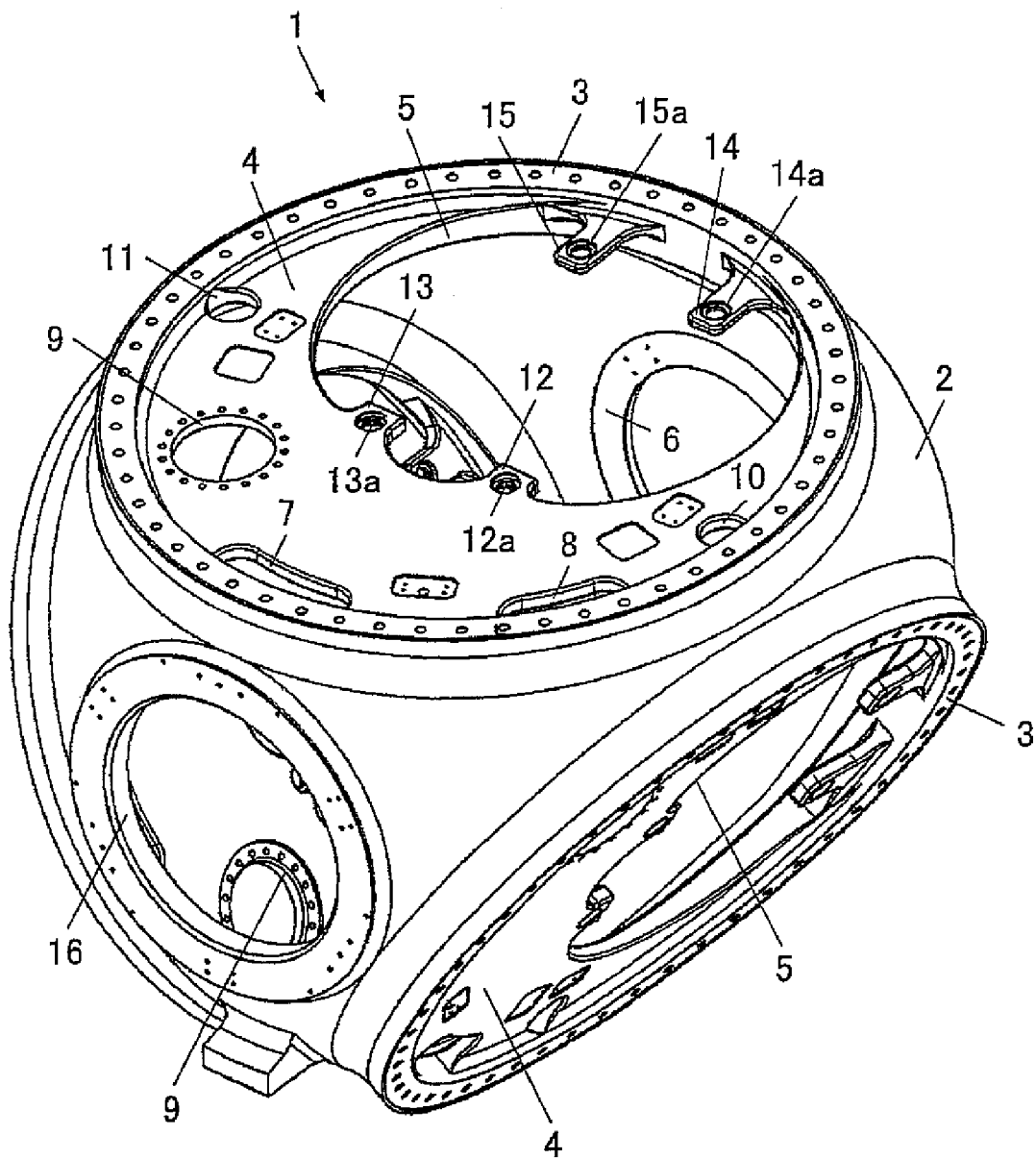
FIG. 1 is a perspective view of the hub related to the first embodiment of the present invention.
Figure 2:
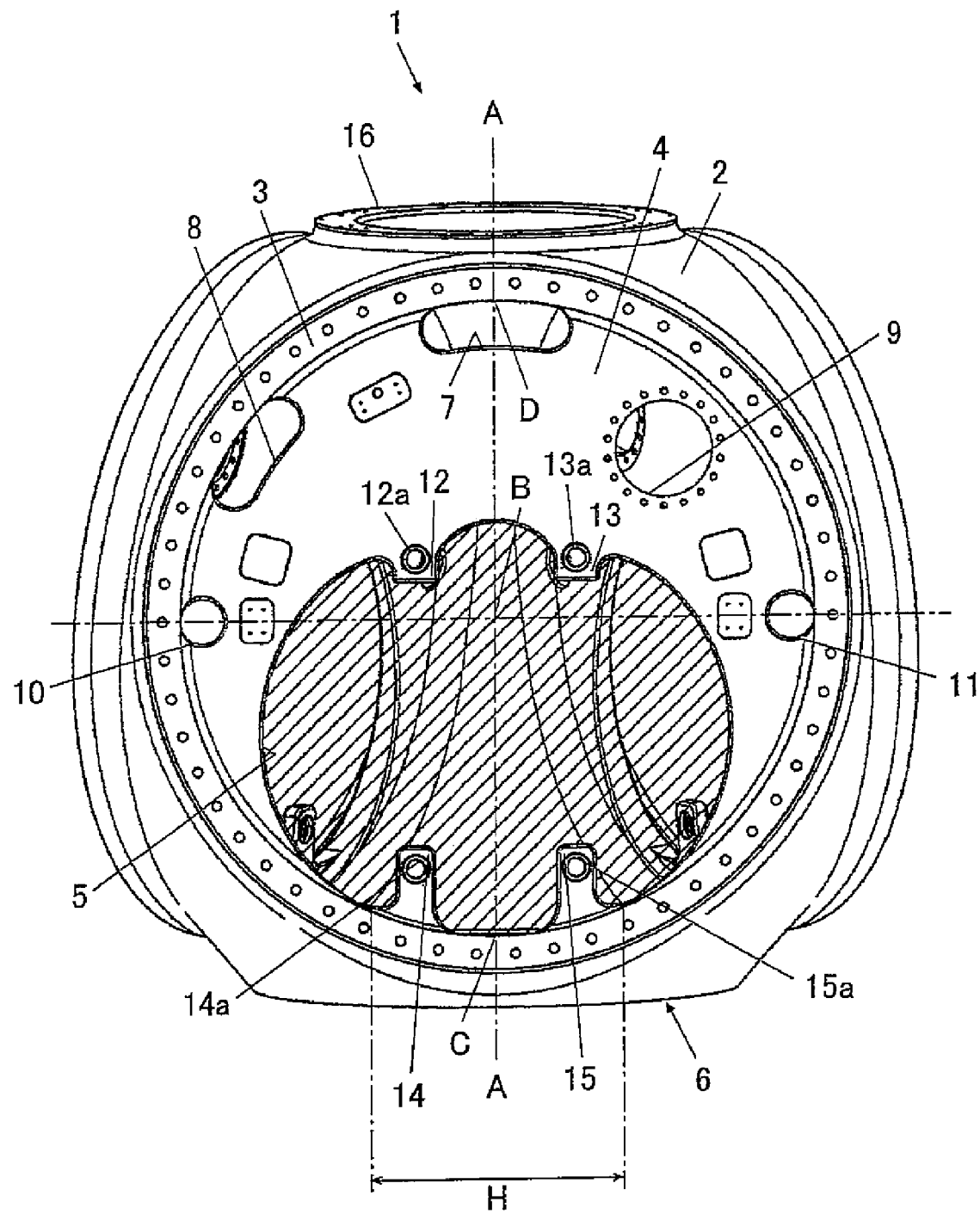
FIG. 2 is a side view of the hub related to the first embodiment of the present invention seen from a direction perpendicular to the plate mounting surface (circular flange)
Figure 3:
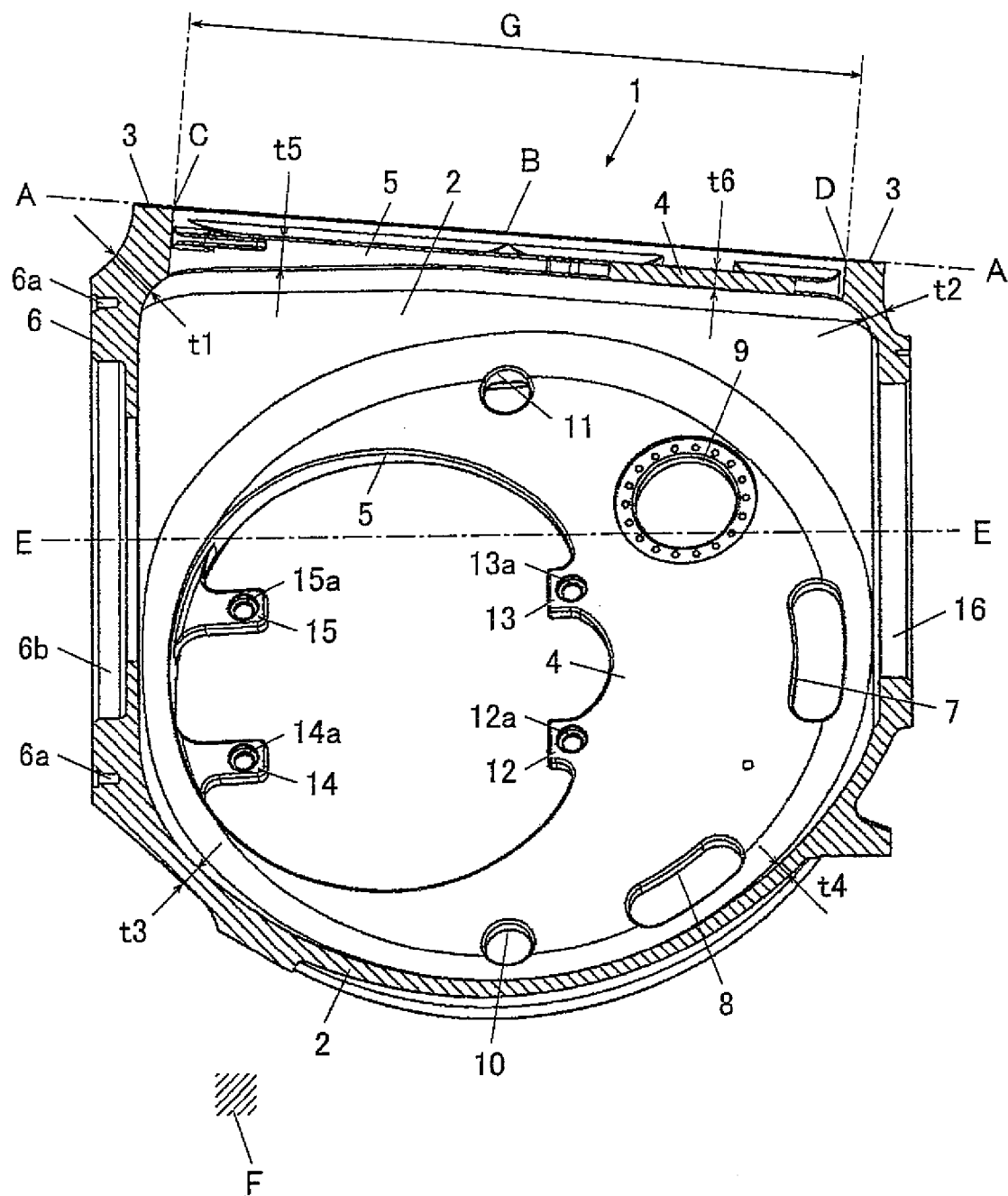
FIG. 3 is a cross section at line A-A in FIG. 2.

As shown in FIG. 1 to FIG. 3, the hub 1 of a horizontal axis wind turbine of this embodiment is comprised by the spherical shell 2, the circular flange 3, the reinforcement plate 4, the off-center opening 5, and the main shaft connecting part 6.

The spherical shell 2 is cut-out at the round region G inside the circular flange 3. In addition, the spherical shell 2 is also cut out at hole 6b of the main shaft connecting part 6 and tip hole 16.

The main shaft connecting part 6 has the stepped hole 6b at the center where the main shaft is fit in. A plurality of female threads 6a, 6a, . . . are provided at suitable locations on the peripheral edge. These female screws thread into bolts which secure the outer peripheral flange of the main shaft. Axis E-E is a center axis of the main shaft connected to the main shaft connecting part 6. The hole 6b of the main shaft connecting part 6 and tip hole 16 are formed in the same axis of the center axis E-E.

Figure 7:
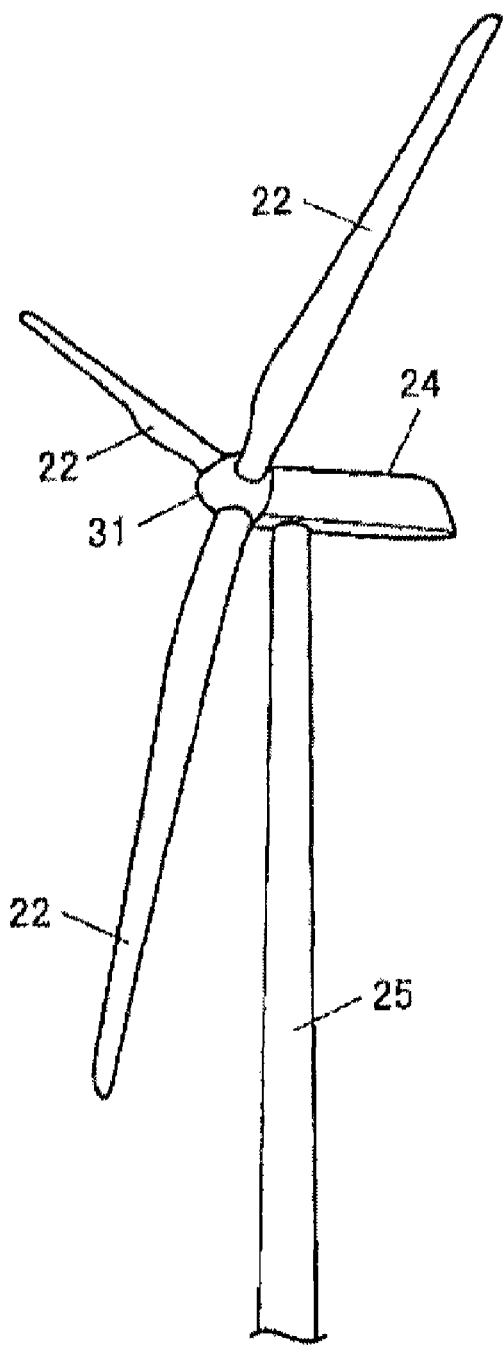

The hub 1 of this embodiment is a hub used to form a rotor that has three blades 22 shown in FIG. 7. The hub of the present invention is not limited to three blades. Any number of blades can be used. The circular flange 3 is provided with the same number of blades (three in this embodiment) in view of the angle (120 degrees in this embodiment) uniformly divided by the number of blades surrounding the center axis E-E.

A reference plane F that contains the center B of the circular flange 3 (in other words, the center of the region G) as well as the center axis E-E, correspond to the cross section illustrated in FIG. 3. C is the one intersection point on the main shaft connecting part 6 side, from among the two points C and D that are intersection points of the reference plane F and the peripheral edge in the region G.

The common line between the plane surface that contains the outside edge of the circular flange 3 that is mated with the base assembly of a blade and the reference plane F correspond to the vertical center line A-A of the circular flange 3. The vertical center line A-A of each circular flange 3 is not parallel to the center axis E-E and is sloped with respect to the center axis E-E such that the distance between A-A and E-E becomes wider closer to the connecting part 6. The slope with respect to the center axis E-E of this circular flange 3 is utilized as a draft angle when removing a mold.

The reinforcement plate 4 and the off-center opening 5 are arranged in the region G inside the circular flange 3.

The reinforcement plate 4 is a board parallel to the circular flange 3. The plane surface parallel to the circular flange 3 is a plane surface that perpendicularly intersects the center axis of the circular shape of the circular flange 3. The reinforcement plate 4 is coupled to the spherical shell 2 at the peripheral edge of the region G.

The off-center opening 5 makes contact with the point C as shown in FIG. 2. In addition, the off-center opening 5 is formed so as to contain the center B of the region G. Even further, the off-center opening 5 makes contact with the peripheral edge of the region G in width H that contains the point C.

The reinforcement plate 4 is formed inside the region G, in the remainder portion of the region G after removing the off-center opening 5. Because of this, the reinforcement plate 4 is not formed in the range of the off-center opening 5. The reinforcement plate 4 is not coupled to the spherical shell 2 in the range of width H either.

The off-center opening 5 is off-center on the point C side and the reinforcement plate 4 is off-center on the point D side.

A small hole 7 is formed at an opposite position of the off-center opening 5 inside the region G. The small hole 7 is used as a tool hole for inserting tools into the hub 1 during assembly or performing maintenance on a wind turbine that uses the hub 1. A small hole 8 is also formed as a similar type of tool hole. The off-center opening 5 can also be used as a tool hole. A geared motor that drives the pitch of the blades can be attached to a circular hole 9 provided on the reinforcement plate 4. Other than this, circular holes 10, 11 can also be formed inside the region G.

Convex members 12, 13 are formed on the peripheral edge of the off-center opening 5. Furthermore, convex members 14, 15 are also formed on the peripheral edge of the region G of the range of width H at a position opposite the convex members 12, 13. Holes 12a, 13a, 14a, and 15a are formed in each of the convex members 12, 13 14, and 15 and can be used to secure devices arranged inside and outside the hub 1.

As shown in the cross section of FIG. 3, for this hub 1, the thickness of the spherical shell 2 changes from the main shaft connecting part 6 to the tip of the opposite side of the main shaft connecting part 6. The thickness gradually decreases from t1 of the spherical shell 2 shown as an example to t2 of the spherical shell 2 of the tip. In the same manner, the thickness gradually decreases from t3 of the spherical shell 2 and thereafter increases and continues to t4 of the spherical shell 2 of the tip.

The thickness of the reinforcement plate 4 gradually decreases from the main shaft connecting part 6 to the tip of the opposite side of the main shaft connecting part 6. The thickness gradually decreases from t5 of the reinforcement plate 4 shown as an example to t6 of the reinforcement plate 4 of the tip.

Figure 4:
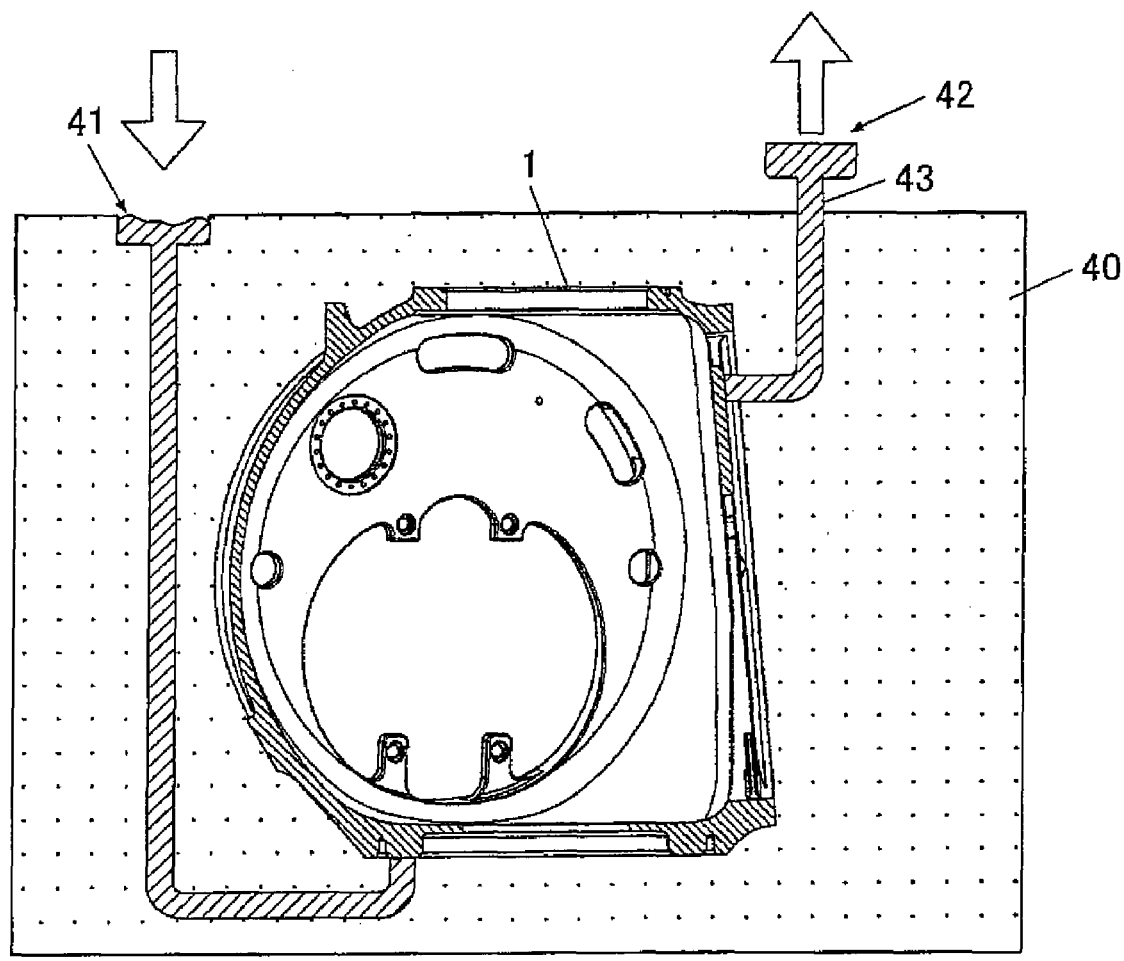
FIG. 4 is a cross section showing a casting process of the hub related to the first embodiment of the present invention.

Next, the strength and the lightweight properties of the hub 1 will be described while describing the casting process of the hub 1. FIG. 4 is a cross section showing the casting process of the hub of this embodiment.

As shown in FIG. 4, an inlet port 41 and an exhaust port 42 for molten metal are formed on the upper area of an outer mold 40. The outer mold 40 is comprised of at least an upper mold and a lower mold divided up and down. A sand mold is used for a core cylinder (not shown in the figure). A molding space for the hub 1 is formed by the outer mold 40 and the core cylinder. When molten metal is poured into the inlet port 41, the molten metal passes into the lower side of the molding space of the hub 1 and is introduced into the molding space of the hub 1. The molten metal then rises up inside the molding space of the hub 1 and reaches the upper area of the exhaust port 42. The molten metal 43 discharged from the molding space of the hub 1 and amassed up to the upper area of the exhaust port 42 is referred to as riser or flow off. The general purpose of this riser or flow off is to supply molten metal to the inside of the molding space to counter the contraction of the molten metal and instantly apply a static pressure to the molten metal inside of the molding space at the completion of the casting.

After the casting process as described above, the lower area on the inlet side solidifies and then the upper area of the exhaust side solidifies. Compared to the lower area on the inlet side, segregation or microscopic shrinkage (micro-porosity) easily occurs on the upper area on the exhaust side. Because a thinner casing makes it more difficult for defects to occur while casting such as segregation or microscopic shrinkage, the casing thickness of the hub 1 is formed to be thinner higher up in the mold. Nevertheless, compared to the lower area on the inlet side, the upper area of the exhaust side has a disadvantage in strength at the spherical shell 2. However, according to the hub 1, the reinforcement plate 4 mainly reinforces the tip of the hub 1 at the upper area on the mold and obtains a balanced strength for the entire hub 1.

Because a balanced strength is obtained for the entire hub 1, there is no need to thicken the casing at weak areas of the spherical shell 2. Thus it is possible to pursue even thinner casing overall which in turn makes it easier to reduce the weight due to thinner casing.

Even further, by means of providing the off-center opening 5 at the area where a thick casing of the main shaft connection side of the hub 1 is formed, an area where the casing should be formed with a greater thickness is omitted. Therefore, the weight can also be effectively reduced with regard to the surface area of the off-center opening 5.

During the mold removal process, the hub 1 is removed from the upper mold in the direction of the main shaft connecting part 6. Thereafter, processing such as holes or female threads required but not formed by the casting, deburring as well as other required subsequent processing are performed.

Figure 8:
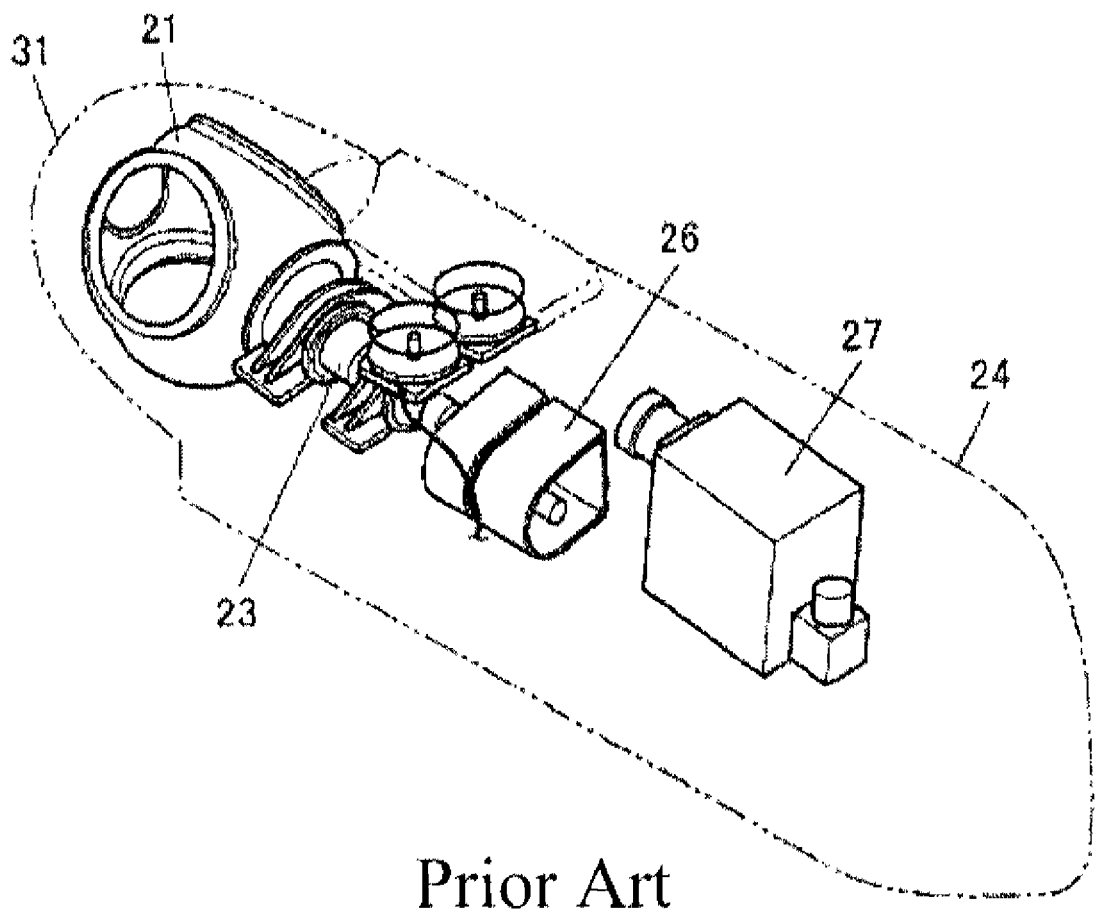
FIG. 8 is on interior view of the nacelle shown in FIG. 7.
Figure 9:
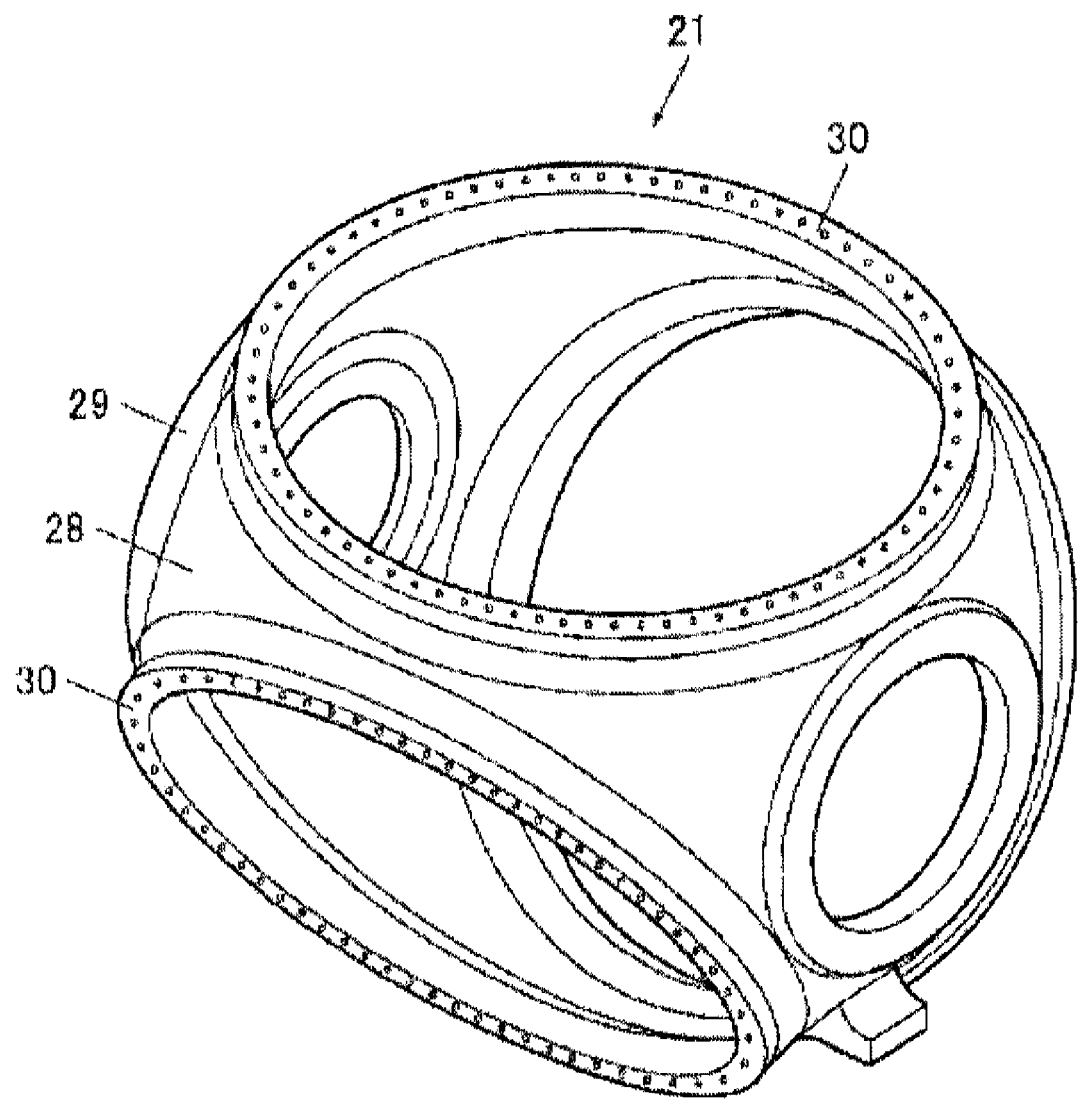
FIG. 9 is a single perspective view of the conventional hub shown in FIG. 8.

The hub 1 comprised as described above is applied in place of the hub 21 shown in FIG. 8 and the main shaft 23 and blades 22 are connected to the hub 1 to form the horizontal axis wind turbine as shown in FIG. 7.

Second Embodiment

Next, a second embodiment of the present invention will be described referring to FIG. 5 to FIG. 6.

Figure 5:
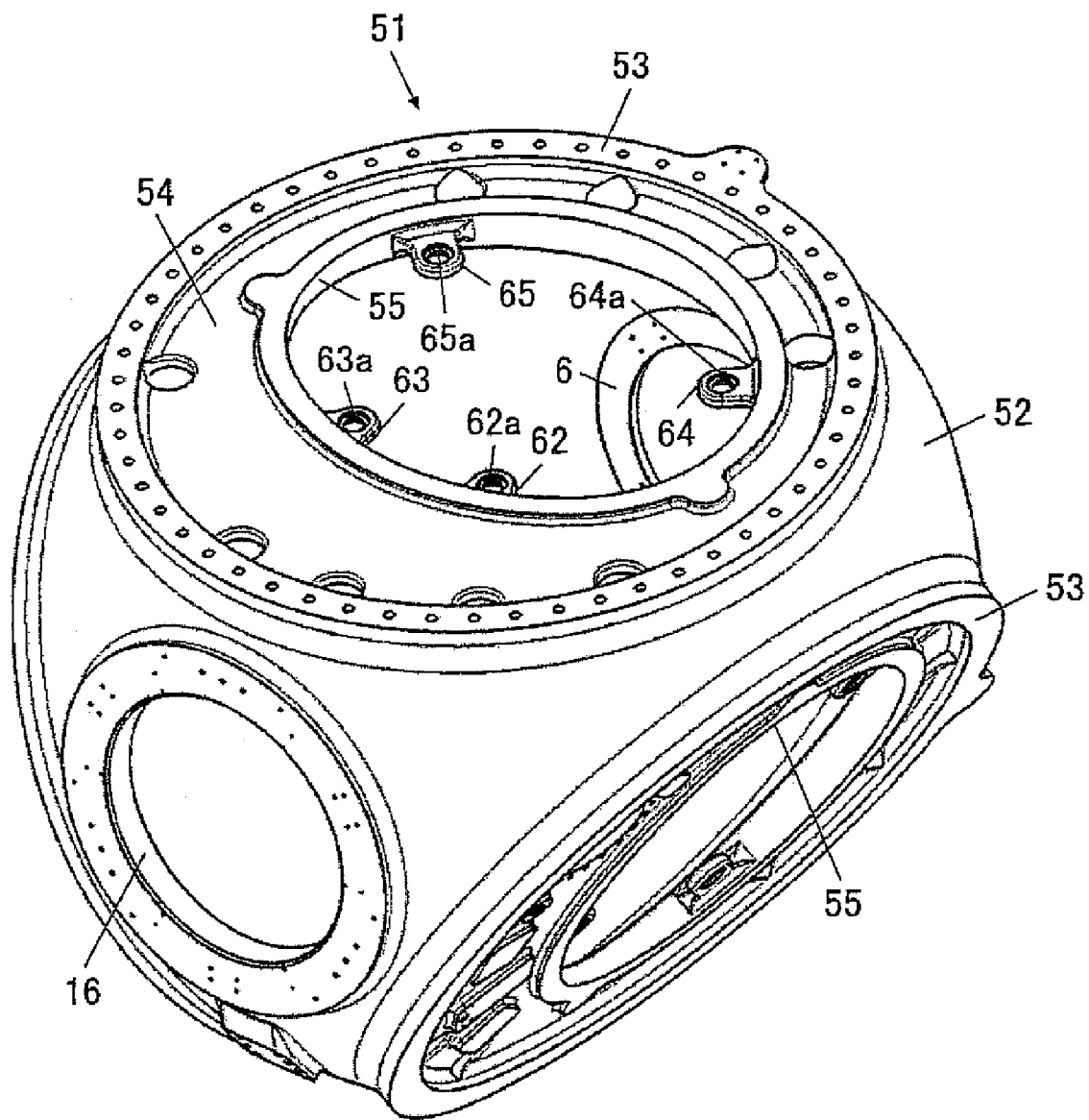
FIG. 5 is a perspective view of the hub related to the second embodiment of the present invention.
Figure 6:
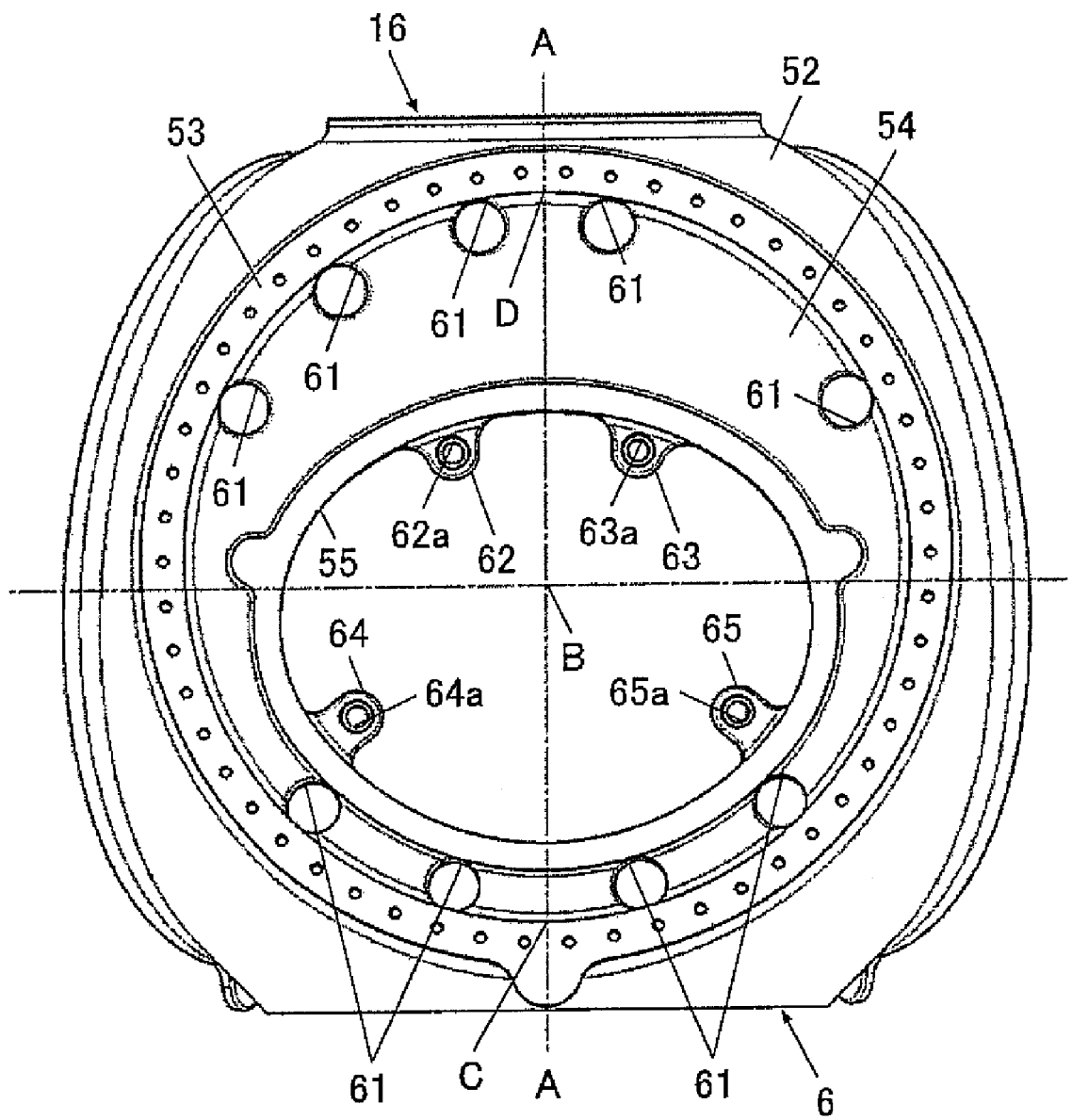
FIG. 6 is a side view of the hub related to the second embodiment of the present invention seen from a direction perpendicular to the plate mounting surface (circular flange)

As shown in FIG. 5 and FIG. 6, the hub 51 of the horizontal axis wind turbine of this embodiment is comprised by the spherical shell 52, the circular flange 53, the reinforcement plate 54, the off-center opening 55, and the main shaft connecting part 56. Although the hub 51 of the horizontal axis wind turbine of this embodiment is almost the same as the first embodiment, the composition of the reinforcement plate and the holes inside the circular flange 53 is different as described below.

Similarly to the first embodiment, the center B of the circular flange 53 and the two intersection points C and D of the reference plane F and the peripheral edge of the round region G in this embodiment are shown in FIG. 6.

Although the off-center opening 55 is off center on the point C side as shown in FIG. 6, the off-center opening 55 is separated from the point C. In addition, the off-center opening 55 is formed so as to contain the center B. The reinforcement plate 54 is formed inside the region G inside the circular flange 53, at a reminder portion of the region G after removing the off-center opening 55.

Therefore, the reinforcement plate 54 is not formed in the range of the off-center opening 55. The off-center opening 55 is off-center on the point C side and the reinforcement plate 4 is off-center on the point D side. Circular holes 61, 61, . . . are formed inside the region G inside the circular flange 53 on the hub 51. The circular hole 61 is arranged in the region between the circular flange 53 and the off-center opening 55 on both sides of the points C and D. The circular hole is also arranged so as to make contact with the inner edge of the circular flange 53.

Four convex members 62, 63, 64, and 65 are formed on the peripheral edge of the off-center opening 55. Holes 62a, 63a, 64a, and 65a are formed on each of the convex members 62, 63, 64, and 65. The convex members can be used to secure devices arranged inside and outside the hub 1.

What is claimed is:

1. A hub of a horizontal axis wind turbine comprising:
   a shell having formed thereon a main shaft connecting part, a flange used for securing a blade and a reinforcement coupled to said shell at a peripheral edge of an inner region inside said flange,
   wherein a reference plane is defined by a center of said inner region and a central axis of a main shaft connected by said main shaft connecting part, and an opening is formed at said inner region that is off-centered toward a side of a first of two points at the intersection of said reference plane and the peripheral edge of said inner region, said first point being at said main shaft connecting part side;
   wherein a thickness of said reinforcement is gradually reduced from said main shaft connecting part side to an opposite side.

2. The hub of a horizontal axis wind turbine of claim 1, wherein said opening contacts said first point.

3. The hub of a horizontal axis wind turbine of claim 2, wherein said opening contacts the peripheral edge of said inner region at a predetermined width that includes said first point.

4. The hub of a horizontal axis wind turbine of claim 1, further comprising a small hole formed at an opposite position of said opening at said inner region.

5. The hub of the horizontal axis wind turbine of claim 1, wherein said opening at said inner region is a hole formed on said reinforcement.

6. The hub of the horizontal axis wind turbine of claim 1, wherein said shell is a spherical shell.

7. The hub of the horizontal axis wind turbine of claim 1, wherein said inner region is round shaped.

8. The hub of the horizontal axis wind turbine of claim 1, wherein said opening includes the center of said inner region.

9. A method of manufacturing a hub for a horizontal axis wind turbine, the method comprising:
   providing a mold having an outer mold and a core cylinder for positioning within the outer mold, wherein the outer mold includes an upper portion, a lower portion, an inlet port extending through the upper portion, and an outlet port extending through the upper portion, wherein the inlet port provides a pathway to the lower portion of the outer mold for a molten metal;
   introducing molten metal into the inlet port such that the molten metal flows through the inlet port to the lower portion of the outer mold until the molten metal fills the outer mold surrounding the core cylinder and flows out of the outlet port;
   allowing the molten metal to solidify within the mold such that a resulting hub defined by the solidified metal has a casing thickness that decreases from a lower portion of the hub defined by the lower portion of the outer mold to an upper portion of the hub defined by the upper portion of the outer mold; and
   removing the hub from the mold.

10. The method of claim 9, wherein the mold defines a plurality of circular flanges on the hub, each of the plurality of circular flanges configured to secure a blade to the hub.

11. The method of claim 10, wherein the mold defines three circular flanges.

12. The method of claim 10, further comprising forming an opening within each of the plurality of circular flanges, the opening being offset with respect to a center of the circular opening.

13. The method of claim 12, wherein a reinforcement plate is positioned within each of the plurality of circular flanges adjacent the off-center opening to provide a balanced strength for the hub.

14. The method of claim 13, wherein the mold further defines an opening in the lower portion of the hub configured to receive a main shaft.

15. The method of claim 14, wherein a thickness of the reinforcement plate positioned within each of the plurality of circular flanges is gradually reduced as it extends away from the opening in the lower portion of the hub configured to receive the main shaft.

16. The method of claim 15, further comprising:
    introducing a main shaft through the opening in the lower portion of the hub;
    securing the main shaft to the hub; and
    securing a plurality of blades to the hub, wherein each of the plurality of blades is secured to one of the plurality of circular flanges on the hub.

17. The method of claim 16, further comprising:
    forming a plurality of threads on the hub adjacent to the opening in the lower portion of the hub configured to receive the main shaft.

18. The method of claim 14, wherein the mold further defines an opening in the upper portion of the hub configured to receive a tip of the main shaft.

* * * * *